United States Patent
Gunn

(10) Patent No.: US 12,254,078 B2
(45) Date of Patent: Mar. 18, 2025

(54) APPARATUS AND METHOD FOR FORENSIC PASSWORD RESET

(71) Applicant: MASTERCARD INTERNATIONAL INCORPORATED, Purchase, NY (US)

(72) Inventor: Eric Gunn, St. Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 302 days.

(21) Appl. No.: 17/565,233

(22) Filed: Dec. 29, 2021

(65) Prior Publication Data
US 2023/0205866 A1 Jun. 29, 2023

(51) Int. Cl.
G06F 21/45 (2013.01)
G06F 9/455 (2018.01)
H04L 9/30 (2006.01)

(52) U.S. Cl.
CPC .......... *G06F 21/45* (2013.01); *G06F 9/45558* (2013.01); *H04L 9/30* (2013.01); *G06F 2009/45587* (2013.01)

(58) Field of Classification Search
CPC .............. G06F 21/45; G06F 9/45558; G06F 2009/45587; G06F 2221/2131; G06F 21/46; H04L 9/30; H04L 9/0863; H04L 9/0891; H04L 9/3226
USPC ............................................................. 726/2
See application file for complete search history.

(56) References Cited

U.S. PATENT DOCUMENTS

| | | | |
|---|---|---|---|
| 6,370,250 B1 * | 4/2002 | Stein .................... | H04L 9/3226 380/284 |
| 9,218,480 B2 | 12/2015 | Fakhral et al. | |
| 9,977,893 B1 | 5/2018 | Jancula et al. | |
| 10,826,875 B1 * | 11/2020 | Kim .................... | H04L 63/0428 |
| 10,904,014 B2 | 1/2021 | Wu | |
| 2009/0036096 A1 * | 2/2009 | Ibrahim ................ | H04L 63/18 455/411 |
| 2014/0189808 A1 * | 7/2014 | Mahaffey ............ | G06F 21/6245 726/4 |

(Continued)

OTHER PUBLICATIONS

Unknown, "Trinity Rescue Kit/CPR for your computer" TrinityHome.com, 2020-2021, 8 pages, https://trinityhome.org/.

(Continued)

*Primary Examiner* — Tan Doan
(74) *Attorney, Agent, or Firm* — Barta Jones, PLLC

(57) ABSTRACT

The disclosure herein describes using a password reset agent to automatically change the password of a computing device. A password reset agent is executed at a root level of the computing device, wherein the password reset agent is associated with a public key. A data source is polled by the password reset agent for a private key associated with the public key. Based on finding the private key on the data source, a reset password is determined and based on determining the reset password, the password reset agent changes a current password of the computing device to the determined reset password. The password reset agent runs in the background on the computing device, enabling the agent to change the password, even when the computing device is locked or otherwise inaccessible. The described password reset agent can also be used on virtual machines.

20 Claims, 5 Drawing Sheets

(56) References Cited

U.S. PATENT DOCUMENTS

2018/0247483 A1 8/2018 Lindsay
2020/0131110 A1 10/2020 Gokhale et al.

OTHER PUBLICATIONS

Unknown, "Passper WinSenior Device", Passper, 2021, 17 pages, https://passper.imyfone.com/windows-password-recovery/.

* cited by examiner

APPARATUS AND METHOD FOR FORENSIC PASSWORD RESET

BACKGROUND

Modern computing devices are typically secured using passwords. Passwords control access to the devices and the data thereon, but in situations in which a password for a device is unknown, it can be challenging for administrators or other users to regain access to the device. Further, if users have been locked out of a device due to malicious actions, it is difficult to regain access to the device and still preserve data that is useful for forensic purposes (e.g., rebooting the device may remove useful data about the state of the device prior to the reboot).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for using a password reset agent to automatically change the password of a computing device is described. A password reset agent is executed at a root level of the computing device, wherein the password reset agent is associated with a public key. A data source is polled by the password reset agent for a private key associated with the public key. Based on finding the private key on the data source, a reset password is determined and based on determining the reset password, the password reset agent changes a current password of the computing device to the determined reset password.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized system and method for resetting a password of a computing device or virtual machine (VM) using a root-level password reset agent. The password reset agent is installed and executed as a root-level process on the computing device, providing the agent with sufficient privileges to change password(s) of the device and protecting the agent from interference by users or processes with insufficient privileges. The password reset agent is configured to automatically poll interfaces of the device and/or other data sources to identify the presence of private keys that match a public key of the agent. The private key is verified cryptographically with the public key. Based on successful verification, the agent is configured to change the current password of a target device (e.g., the device hosting the agent), for example, to a reset password. The reset password to be used is pre-stored with the agent and/or obtained at the time of reset from the data source associated with the private key as described herein.

The disclosure operates in an unconventional manner at least by configuring the password reset agent to automatically change the password of the device based on periodically polling for the presence of a private key (e.g., on a local or remote peripheral of the device). Because the agent runs automatically upon startup of the computing device and has sufficient privileges to change the password of the device, the disclosure enables the password of the device to be changed without rebooting or otherwise interfering with the current operations of the device. The agent enables the password to be reset when the device is locked or otherwise inaccessible. The agent also enables the password to be reset on unlocked devices.

Because the state of the device is preserved when the agent automatically resets the password (other than the change in password), the disclosure enables forensic tasks to be performed on the computing device after resetting the password. In contrast, in other systems that require a reboot to reset the password, if a locked device was interfered with by a malicious actor prior to the password reset, some or all of the evidence of the interference may be destroyed by rebooting the device in order to gain access.

Further, the agent enables the password of a computing device to be changed without causing significant downtime for the device. For instance, if the computing device is a server that performs operations that are important for the functionality of many other devices in a network, stopping that server in order to regain access may result in a significant negative effect to the other devices in the network. The disclosed agent enables a password of such a server to be reset automatically, efficiently, and without significantly interrupting the operations of the server. This improves the functioning of the device at least by improved management of computing resources of the device.

Figure 1:
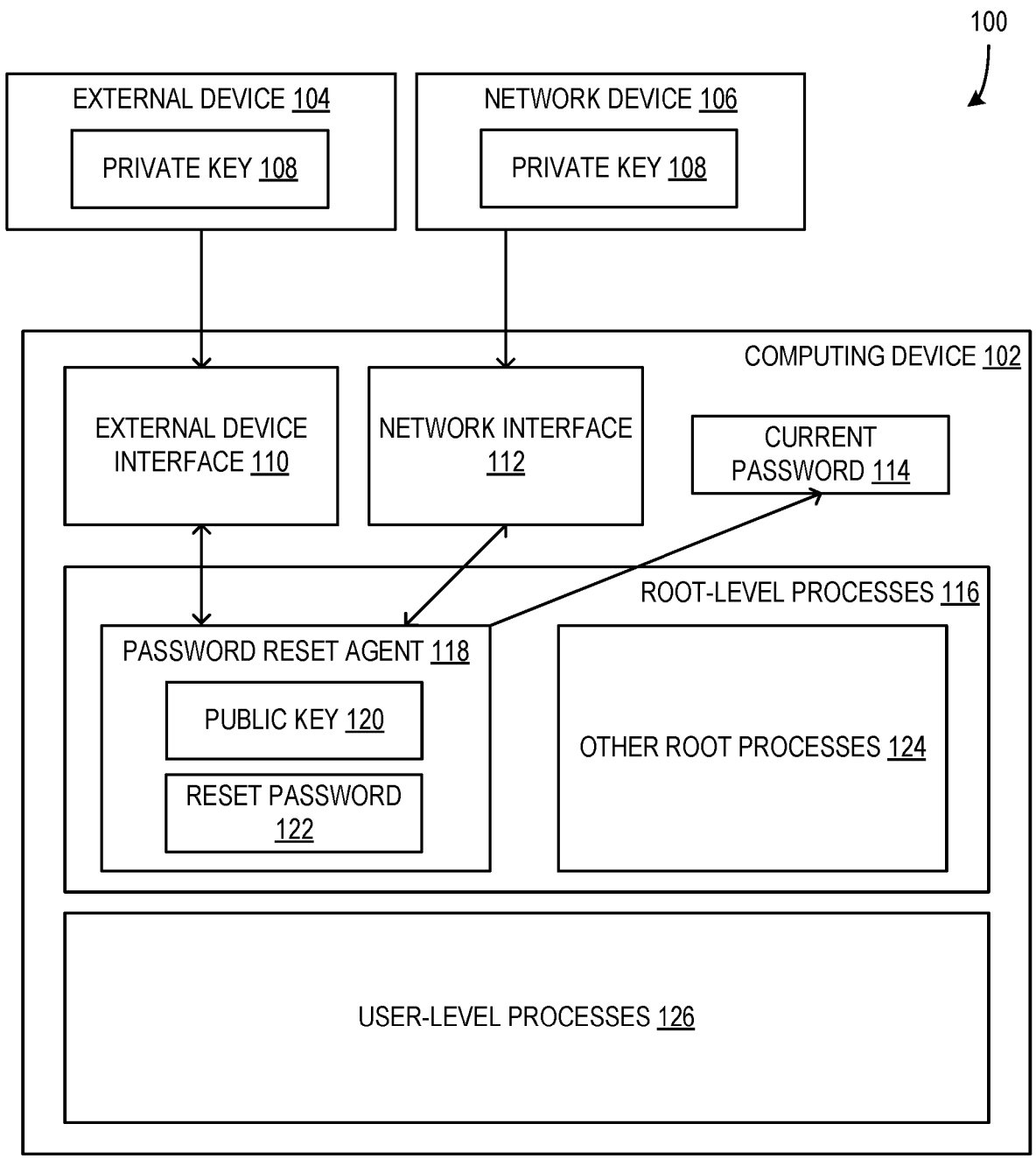
FIG. 1 is a block diagram illustrating a system including a password reset agent configured to automatically reset a password of a computing device based on detecting an external device.

FIG. 1 is a block diagram illustrating a system 100 including a password reset agent 118 configured to automatically reset a password 114 of a computing device 102 based on detecting an external device (e.g., external device 104 and/or network device 106). The system 100 includes a computing device 102 that is secured using a current password 114, such that accessing the functions of the computing device 102 requires that the current password 114 be provided to the computing device 102 via an interface thereof (e.g., entered with a keyboard of the computing device 102). Further, in some examples, the password reset agent 118 of the computing device 102 is configured to detect a private key 108 on an external device 104 or a network device 106 and, based on detecting that private key 108, the password reset agent 118 is configured to change the current password 114 of the computing device 102 to a reset password 122.

The computing device 102 includes an external device interface 110 and/or a network interface 112. In some examples, the external device interface 110 is configured to enable the computing device 102 to interact and/or communicate with external devices such as external device 104. For instance, in an example, the external device 104 is a universal serial bus (USB) device and the external device interface 110 is a USB port on the computing device 102. In such examples, the external device 104 is connected to the external device interface 110 through inserting the USB connector portion of the external device 104 into the USB port of the computing device 102. Further, in some examples, connection between the external device 104 and the computing device 102 via the external device interface 110 also includes initial communications between the computing device 102 and the external device 104 via which the computing device 102 determine what sort of data is stored on the external device 104. As described herein, the external device 104 includes a private key 108 that is read and/or identified by the password reset agent 118 of the computing device 102 upon the agent 118 detecting the connection of the external device 104 to the external device interface 110. In other examples, the computing device 102 includes more and/or different external device interfaces 110 such as interfaces for reading data from external disks (e.g., compact disks (CDs), digital video disks (DVDs)) and/or interfaces for communicating with external devices 104 wirelessly, such as a BLUETOOTH interface or a Near-Field Communication (NFC) interface.

Additionally, or alternatively, the computing device 102 is configured to interact and/or communicate with a network device 106 in substantially the same way as described above with respect to the external device 104. In some examples, the password reset agent 118 is configured to detect a connection between the network interface 112 of the computing device 102 and a network device 106 and, based on detecting that connection, the password reset agent 118 is configured to read and/or identify the private key 108 stored on the network device 106. In such examples, the network device 106 is another computing device that is configured to communicate over a network (e.g., a private intranet, public network, the Internet, or the like) with the computing device 102. For instance, in an example, the password reset agent 118 is configured to periodically and/or regularly poll an IP address, FTP site, or other storage location of a network device 106. Further, in examples where password reset agents 118 of multiple computing devices 102 are configured to poll a network device 106 or to otherwise obtain a private key 108 from a network device 106, passwords of the multiple computing devices 102 are configured to be reset by the associated password reset agents 118 based on the private key 108 being present on the single network device 106.

In examples where the password reset agent 118 detects the presence of an external device 104 and/or a network device 106 but does not find a private key 108 thereon, the password reset agent 118 is configured to continue standing by and detecting future connections with external devices 104 and/or network devices 106. In examples where the password reset agent 118 is configured to poll the various interfaces 110-112 of the computing device 102 for connections to devices with private keys 108, the agent 118 is configured to continue polling those interfaces until a private key 108 is found, at which point the agent 118 performs password reset processes as described herein.

The computing device 102 is configured to execute or otherwise perform processes such as root-level processes 116 and/or user-level processes 126. Root-level processes 116 (e.g., the password reset agent 118 and/or other root processes 124) or administrator (admin)-level processes are those processes that have access privileges to most or all resources of the computing device 102, such as configuration resources, settings resources, resources of the operating system (OS) that are otherwise off limits to most processes, or the like. In some examples, root-level processes 116 also have higher priority than user-level processes 126 when limited system resources are being shared between the two types of processes. Further, in some examples, root-level processes 116 are protected from being changed or halted by user-level processes 126 or user-level commands. Thus, many processes that run in the background of the computing device 102 and perform low level administrative tasks to maintain the functionality of the computing device 102 are root-level processes 116. In other examples, such processes are called administrator processes, admin processes, super-user processes, or the like without departing from the description.

User-level processes 126 are those processes that have limited access privileges to configuration resources, settings resources, administrative resources, and/or other resources of the computing device 102. In some examples, user-level processes 126 include processes initiated by non-administrator users of the computing device 102. For instance, such processes 126 include processes associated with applications that are used by non-administrator users. Further, in some examples, the user-level processes 126 are configured to have more limited capabilities to run automatically in the background and/or to access interfaces of the computing device 102 such as external device interface 110 and/or network interface 112.

The password reset agent 118 is executed or otherwise performed as a root-level process 116, or not as a user-level process 126. Due to the password reset agent 118 running as a root-level process 116, it is configured to have access privileges necessary to operate as a background process and to change the current password 114. Further, the agent 118 is protected from interference by users of the device 102 that lack privileges to stop or otherwise alter root-level processes. In some examples, the password reset agent 118 is configured to run continuously as a background process during operation of the computing device 102 and to automatically perform password change operations as described herein upon detecting a device with a private key 108. Additionally, or alternatively, the agent 118 is configured to perform the described password change operations without rebooting or otherwise resetting the device, such that a current state of the computing device 102 is preserved except for the changed password. Further, in such examples, the password reset agent 118 is configured to perform the described password change operations when the computing device 102 is otherwise inaccessible, such as when the device 102 is displaying a lock screen that requires entry of the current password 114.

The password reset agent 118 polls interfaces, such as external device interface 110 and/or network interface 112, of the computing device 102 for the presence of a private key 108. In some examples, the agent 118 is configured to poll each interface of a set of interfaces of the computing device 102 periodically (e.g., once every hour, once every minute, once every 10 seconds, or the like). Further, the agent 118 is configured to determine the set of interfaces to poll based on a set of interface identifiers that is defined when the agent 118 is installed and/or initialized. Additionally, or alternatively, the agent 118 is configured to search the computing device 102 for interfaces (e.g., interfaces of types with which the agent 118 is configured to interact) and to add identified interfaces to the set of interfaces to be polled. For instance, in an example where the agent 118 is configured to poll USB interfaces, the agent 118 searches the computing device 102 for all USB interfaces and adds those identified USB interfaces to the set of interfaces that are periodically polled by the agent 118.

When the password reset agent 118 polls an interface of the computing device 102, the agent 118 is configured to check a device connected to the interface for a private key 108 that is associated with a public key 120 of the agent 118. In some examples, checking for the private key 108 includes checking the device in a defined data storage location for the presence of the private key 108. When data is found on the device that is potentially a private key 108, the password reset agent 118 evaluates the data with respect to the public key 120 using cryptographic processes (e.g., encrypting a data portion using the public key 120, decrypting the encrypted data portion using the potential private key 108, and confirming that the resulting decrypted data portion matches the initial data portion). When the agent 118 verifies the data as a private key 108 via the evaluation, the agent 118 is configured to change the current password 114 to the reset password 122 as described herein. Alternatively, if the data is not verified as a private key 108, the agent 118 is configured to halt interactions with the connected device for the time being.

Additionally, or alternatively, in some examples, the connected device (e.g., the external device 104 or the network device 106) further includes a reset password 122 that the password reset agent 118 is configured to use when changing the current password 114. In such examples, upon verifying that the connected device includes a private key 108, the agent 118 obtains the associated reset password 122 from the connected device and changes the current password 114 to the obtained reset password 122 as described herein.

The password reset agent 118 resets the current password 114 to a reset password 122. In some examples, the password reset agent 118 is configured to vary the reset password 122 used in the reset based a defined scheme or function. For instance, in some examples, the reset password 122 used by the agent 118 is based on the private key 108 that is identified on the connected device. In such examples, the password reset agent 118 is configured to identify more than one private key 108 on connected devices based on one or more public keys 120 stored in association with the agent 118. The agent 118 is further configured to select a reset password 122 to use when changing the current password 114 based on the private key 108 that is identified. Configuring the use of different reset passwords 122 with the agent 118 increases the flexibility of the agent 118 and enables different administrator users to make use of different reset passwords 122 and/or for the reset passwords 122 being used to be swapped out over time to increase the security of the password change methods and operations described herein.

The external device 104 is configured to include a private key 108 that is associated with the public key 120 of the password reset agent 118 as previously described. In some examples, initializing the external device 104 or otherwise installing the private key 108 on the external device 104 is done using the password reset agent 118 and/or another tool that is associated with the password reset agent 118 and/or that has access to the public key(s) 120 of the password reset agent 118. In examples where the external device 104 includes a reset password 122 to be used by the agent 118, the initialization process of the external device 104 also includes a process for generating and/or storing that reset password 122 on the external device 104 (e.g., a process that generates a reset password 122 and/or selects a reset password 122 from a defined password list).

In some examples, the password reset agent 118 is configured to perform forensic preservation operations in addition to the password change operations described herein. In such examples, the agent 118 is configured to preserve the state of the computing device 102 when a password change operation is triggered (e.g., by identifying a private key 108 on a connected device). Such state preservation operations include halting current processes or otherwise recording current process states, recording memory states of the computing device 102, logging out current user sessions, disconnecting network connections that are untrustworthy or extraneous to the password change process (e.g., all or a subset of network connections that are not connections to the network device 106 with the private key 108 are disconnected to prevent interference with the process from outside the computing device 102). By performing such forensic preservation operations, the password reset agent 118 enables activity data of the computing device 102 to be preserved through the password change process, such that administrators are enabled to observe and track activities of malevolent users who previously had access to the computing device 102.

Further, in some examples, the password reset agent 118 is configured to freeze or otherwise preserve the state of the computing device 102 as described above, such that the changing of the current password 114 in combination with the preserved device state prevent users from tampering with the device.

In some examples, the password reset agent 118 is configured to track and/or poll for other types of data or device states and, based on identifying such data or device states, the agent 118 is configured to change the current password 114 to the reset password 122 as described herein. Further, in some examples, the agent 118 is configured to lock or unlock the computing device 102 in addition to changing the password. Such polled data or device states include device location data, date-time data, network connection data or the like. For instance, in an example, the agent 118 polls or otherwise monitors the location of the computing device 102 and, upon detecting that the computing device 102 has left a defined location and/or entered a defined location, the agent 118 performs password change operations as described herein (e.g., a company or agency wants devices containing sensitive data to automatically lock with a changed password any time the devices leave a defined building, campus, or other area). Additionally, or alternatively, the agent 118 is configured to perform password change operations based on a defined time period passing and/or a defined date-time being reached. In other examples, the password reset agent 118 is configured to perform password change operations as described herein based on other detected data or device states without departing from the description.

Additionally, or alternatively, in some examples, after the password reset agent 118 has changed the current password 114 to the reset password 122 as described herein, the agent 118 automatically grants access to the computing device 102 using the newly changed password. In such examples, an administrator who connects a device with a private key 108 for the purpose of changing the password of the computing device 102 is immediately enabled to access the device (e.g., the administrator is automatically signed into the device using the new password).

In some examples, the password reset agent 118 is configured to receive a notification or other signal to deactivate (e.g., a deactivation signal sent over a network connection targeted at the computing device 102). In situations where the computing device 102 is stolen, the agent 118 can be deactivated via such a signal to prevent the agent 118 from being exploited to gain access to the computing device 102.

Further, in some examples, the computing device 102 includes multiple current passwords 114 that enable access to the device 102. Additionally, or alternatively, the computing device 102 is configured with multiple user accounts with differing levels of access privileges to resources of the computing device and each of the multiple user accounts is associated with a different password 114 for accessing the device 102. In such examples, the password reset agent 118 is configured to change one or more of the account passwords to the reset password 122 as described herein to enable access to the computing device 102. For instance, in an example, the password reset agent 118 is configured to change a password of an administrator account or other account with root-level access privileges or otherwise high-level access privileges to the reset password 122 to enable an administrator to access the device 102 with sufficient privileges to perform configuration and/or forensic tasks on the device 102.

Additionally, or alternatively, the password reset agent 118 is configured to be automatically executed on the computing device 102 upon reboot or startup of the computing device 102, such that the agent 118 can be used to reset the current password 114 as described herein after restarting the computing device 102.

The computing device 102 is further configured to include a processor, memory, data storage, and/or other interfaces that enable the computing device 102 to interact with users and/or other devices. In some examples, the computing device 102 is a computing device as described below with respect to FIG. 5. Additionally, or alternatively, the root-level processes 116 and/or user-level processes 126 are executed or otherwise performed by the computing device 102 using a processor, memory, and/or data storage.

Figure 2:
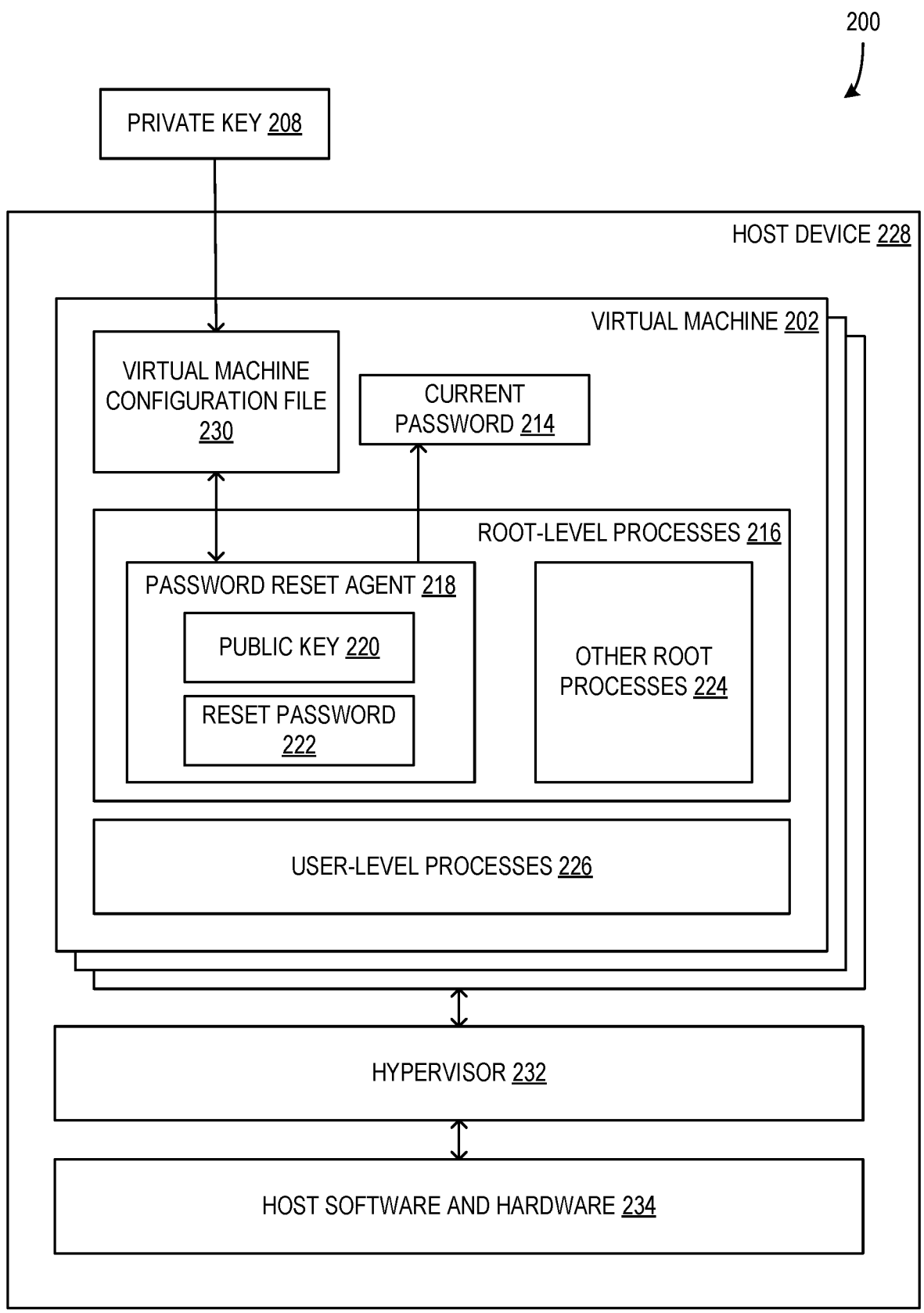
FIG. 2 is a block diagram illustrating a system including a password reset agent configured to automatically reset a password of a virtual machine based on detecting a private key in a virtual machine configuration file.

FIG. 2 is a block diagram illustrating a system 200 including a password reset agent 218 configured to automatically reset a password 214 of a VM 202 based on detecting a private key 208 in a VM configuration file 230 (e.g., a VMX file of a VMWARE virtual machine). The VM 202 is configured to be executed on a host device 228 and/or a plurality of host devices. The host device 228 is configured to include host software and hardware 234 that is used to execute a hypervisor 232 and the hypervisor 232 is configured to create and/or manage the VM 202 and/or other VMs on the host device 228. It should be understood that, in some examples, the features and details of the VM 202 and the associated password reset agent 218 include some or all the features and details described above with respect to the computing device 102 and the associated password reset agent 118 of FIG. 1.

In some examples, the VM 202 is configured based on data in the VM configuration file 230. The VM configuration file 230 includes configuration data such as quantities of resources allocated to the VM 202 from the pool of resources of the computing device 228 (e.g., processing resources, memory resources, data storage resources, and/or other resources of the host software and hardware 234). Further, the VM configuration file 230 includes data that defines how the VM 202 operations (e.g., the types of root-level processes 216 and 224 and/or user-level processes 226 that are created and executed during the operation of the VM 202). Additionally, or alternatively, the hypervisor 232 is configured to use the data in the VM configuration file 230 to create the VM 202 and to allocate resources to the VM 202.

In some examples, the VM 202 is configured to be secured by a current password 214. The current password 214 of the VM 202 can be used to log in to the VM 202 and to access and/or interact with processes of the VM 202 (e.g., the root-level processes 216 and/or the user-level processes 226).

Further, in some examples, the VM 202 executes the password reset agent 218. As illustrated, the password reset agent 218 is executed as a root-level processes 216, but in other examples, the password reset agent 218 is executed as a user-level process 226 without departing from the description. Additionally, or alternatively, in some examples, the password reset agent 218 is configured to function with some or all the features described above with respect to password reset agent 118 of FIG. 1 as described above without departing from the description.

The password reset agent 218 is configured to poll (e.g., periodically as described above with respect to password reset agent 118) or otherwise check the VM configuration file 230 for the presence of a private key 208 that is associated with the public key 220 of the agent 218. In some examples, the VM configuration file 230 includes a location where a private key 208 is stored if it is present, such that the password reset agent 218 polls the file 230 by reading the data in that location. Alternatively, or additionally, the agent 218 is configured to monitor the VM configuration file 230 for changes and, upon detecting a change to the file 230, the agent 218 checks for the presence of a private key 208. Further, in some examples, the agent 218 is configured to receive notifications of changes to the VM configuration file 230 from a separate process of the VM 202.

When the password reset agent 218 identifies a private key 208 or otherwise determines that a private key 208 is present in the VM configuration file 230, the agent 218 is configured to change the current password 214 of the VM 202 to a reset password 222. In some examples, the reset password 222 is included or otherwise associated with the agent 218 (e.g., stored in a data storage location associated with the agent 218). Alternatively, or additionally, the reset password 222 is included in the VM configuration file 230 with the private key 208. For instance, in an example, to trigger the password reset process, the private key 208 and an associated. Further, in other examples, other methods of determining a reset password 222 are used without departing from the description.

In some examples, a private key 208 is added to the VM configuration file 230 via the host software and/or the hypervisor 232. For instance, in an example, the host device 228 is configured to enable an administrator or other user to insert or otherwise add a private key 208 to the VM configuration file 230 while the VM 202 is running. Further, in such an example, the user is enabled to add a reset password 222 or other associated data to the configuration file 230.

Additionally, or alternatively, the host device 228 is configured to include interfaces for connection to external devices and/or network devices (e.g., external device 104 and/or network device 106). In such examples, the host device 228 is configured to detect a private key 208 on the connected device. Based on that detection, the host device 228 is configured to add the detected private key 208 to the VM configuration file 230 of a VM 202 to trigger the password change process described herein. Further, in some examples, the connected device includes a VM identifier that uniquely or pseudo-uniquely identifies a VM 202 from a set of VMs on the host device 228 and, based on that identifier, the host device 228 is configured to add the private key 208 to the configuration file 230 of the VM 202 that is identified by the identifier.

Figure 3:
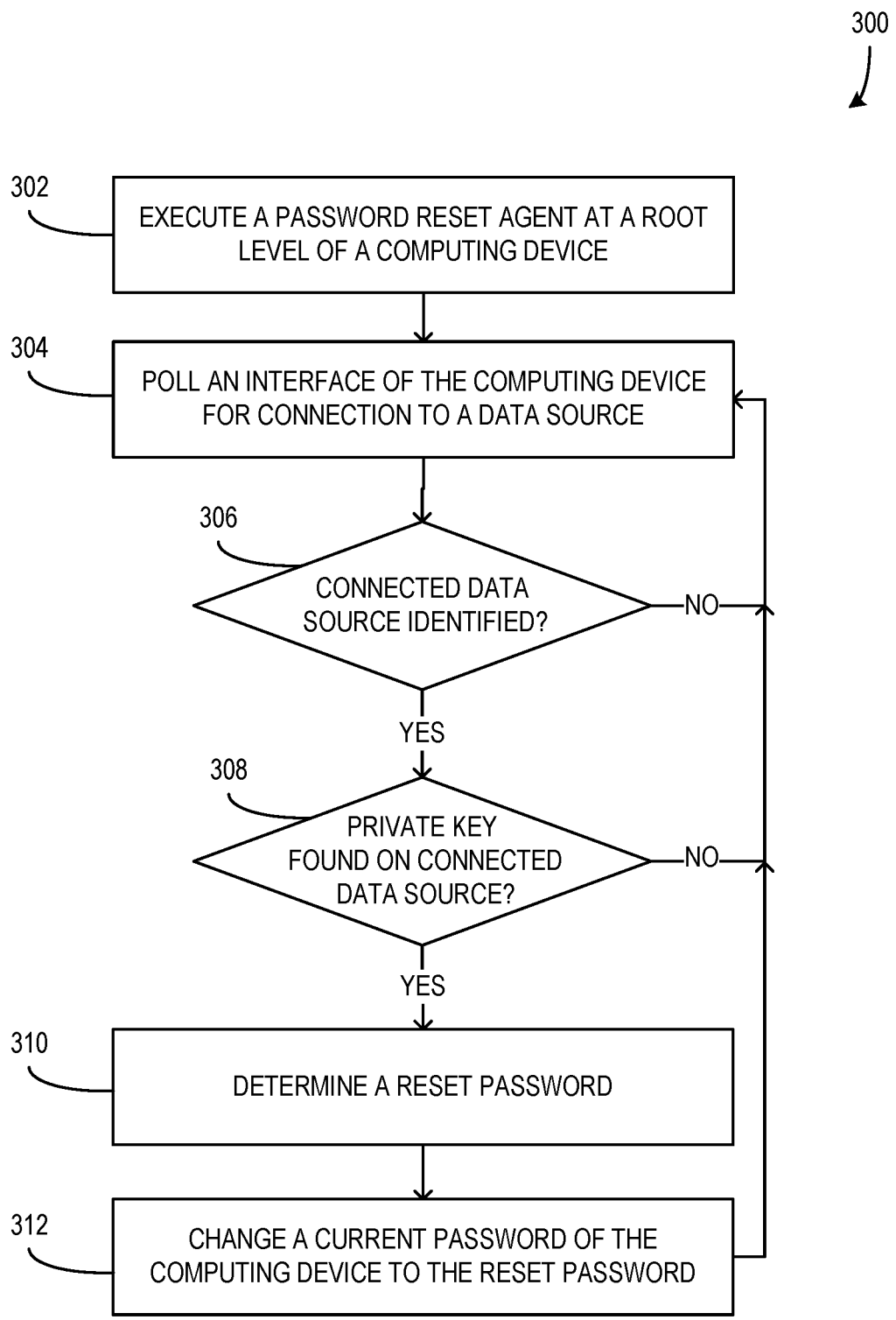
FIG. 3 is a flowchart illustrating a computerized method for performing a password reset operation using a password reset agent on a computing device.

FIG. 3 is a flowchart illustrating a computerized method 300 for performing a password reset operation using a password reset agent (e.g., password reset agent 118) on a computing device (e.g., computing device 102). In some examples, the computerized method 300 is executed or otherwise performed in a system such as system 100 of FIG. 1 as described herein. At 302, a password reset agent is executed at a root level of a computing device. In some examples, the password reset agent is a root-level process that runs in the background during operation of the computing device, and it is protected from interference by non-administrator users due to being a root-level process.

At 304, the password reset agent polls an interface of the computing device for connection to a data source. In some examples, the interface being polled includes at least one of an external device interface (e.g., a USB interface) and/or a network device interface (e.g., an ETHERNET interface, a BLUETOOTH interface, an NFC interface, or the like). Additionally, or alternatively, the polling of the interface includes polling of multiple interfaces of the computing device, including multiple different types of interfaces (e.g., polling two USB interfaces and a BLUETOOTH interface). Further, in some examples, the polling is performed periodically by the password reset agent (e.g., every 10 seconds, every minute, every hour).

At 306, if a connected data source is identified via the polling, the process proceeds to 308. Alternatively, if no connected data source is identified, the process loops back to 304.

At 308, if a private key associated with the public key of the password reset agent is found on the connected data source, the process proceeds to 310. Alternatively, if no private key is found on the connected data source, the process loops back to 304. In some examples, finding a private key on the connected data source includes verifying that the private key is associated with the public key using encryption techniques. For instance, a potential private key is identified on the data source; a test data set is encrypted using the potential private key as a key; the encrypted data set is decrypted using the public key of the password reset agent as a key; and the decrypted data set is compared to the original test data set, wherein a match between the decrypted data set and the test data set indicates that the potential private key is the private key.

In some examples, the password reset agent is configured to poll multiple interfaces in parallel, such that when a data source is identified on one connected data source, the agent proceeds with the described process for that connected data source and continues to periodically poll the other interfaces (e.g., via multiple parallel processes).

At 310, a reset password is determined. In some examples, the reset password to be used is included with the password reset agent and determining the reset password includes reading the reset password from data storage of the agent. Alternatively, or additionally, determining the reset password includes reading a reset password from the data source that is associated with the found private key. In other examples, a reset password is selected from a list or set of possible reset passwords and/or derived through some other method without departing from the description.

At 312, a current password of the computing device is changed to the determined reset password. In some examples, in addition to changing the current password to the reset password, the computing device is unlocked and/or access to the computing device is otherwise provided.

It should be understood that, in some examples, some or all the method 300 is executed or otherwise performed on the computing device while the computing device is locked (e.g., a user is prevented from interacting with the computing device unless the current password is provided). The polling of the interfaces of the computing device is still performed while the device is locked, enabling an administrator user with a private key data source to change the password of the computing device without having the current password.

Further, in some examples, after the current password is changed, the process returns to 304 and continues to poll interfaces as described herein. Alternatively, or additionally, the password reset agent may be stopped or ended after the password is changed and/or based on instructions received from an administrator or other user with sufficient privileges to alter or stop root-level processes.

Additionally, or alternatively, the password reset agent is configured to receive deactivating signals or notifications that cause the agent to halt method 300, such that the agent cannot be used to break into the computing device if the device is stolen.

Figure 4:
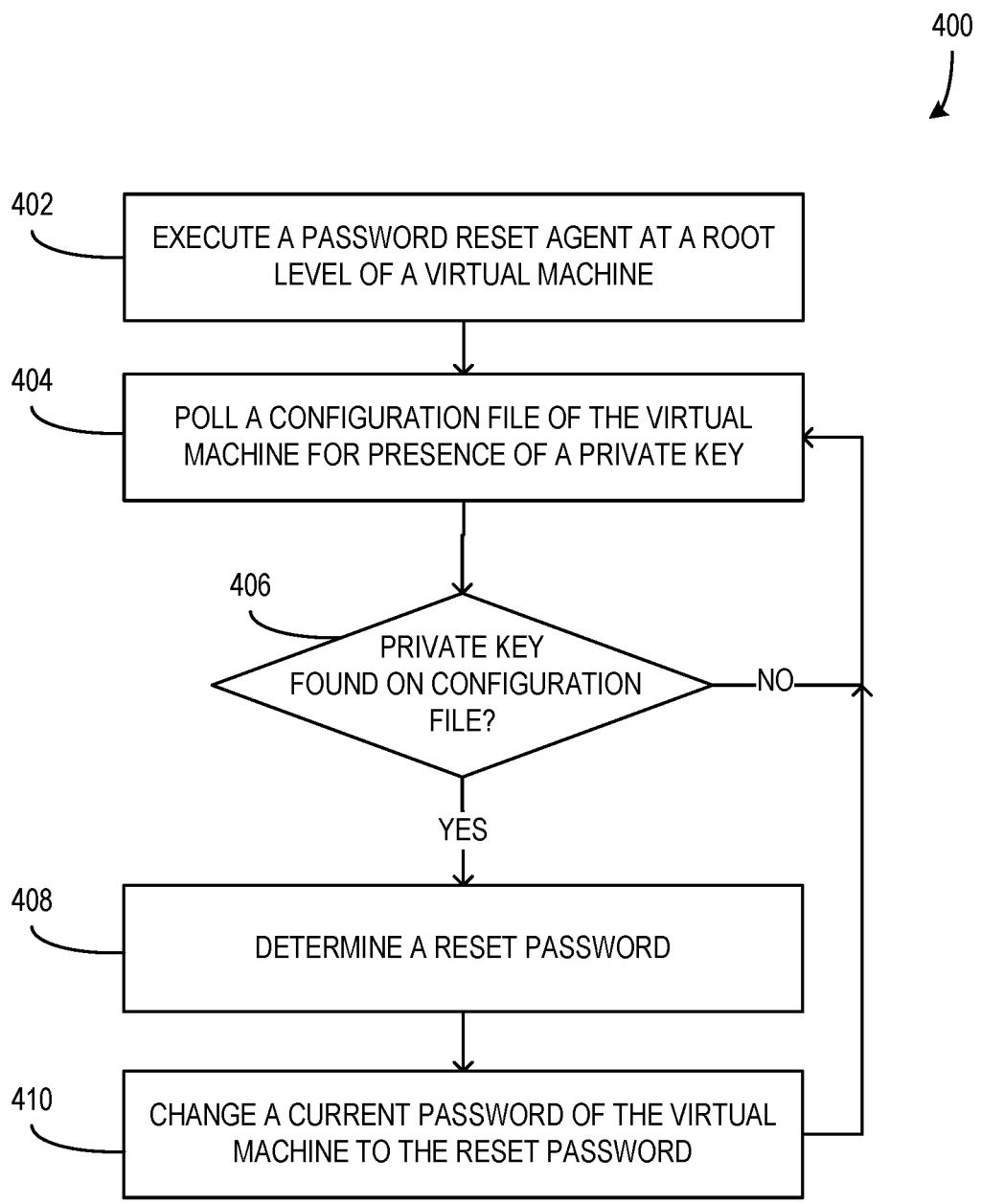
FIG. 4 is a flowchart illustrating a computerized method for performing a password reset operation using a password reset agent on a virtual machine.

FIG. 4 is a flowchart illustrating a computerized method 400 for performing a password reset operation using a password reset agent (e.g., password reset agent 218) on a VM (e.g., VM 202). In some examples, the computerized method 400 is executed or otherwise performed in a system such as system 200 of FIG. 2 as described herein. Further, it should be understood that, in some examples, the computerized method 400 includes some or all the features and details described above with respect to method 300 of FIG. 3 and with systems 100 and 200 of FIGS. 1 and 2, respectively.

At 402, a password reset agent is executed at a root level of a VM. At 404, a configuration file of the VM is polled for the presence of a private key that is associated with a public key of the password reset agent. In some examples, each VM that is running on a computing device includes a root-level password reset agent process that polls its configuration file for private keys as described herein. In such examples, an administrator or other user is enabled to insert or add private keys into any of the VM configuration files to reset the passwords of those particular VMs without interfering with other VMs on the computing device.

At 406, if a private key is found on the configuration file, the process proceeds to 408. Alternatively, if no private key is found on the configuration file, the process returns to 404. As described above, finding the private key in the configuration file includes verifying the found private key cryptographically in some examples.

At 408, a reset password is determined and, at 410, a current password of the VM is changed to the determined reset password.

Additional Examples

In an example, a user of a computing device in an office forgets their password to the computing device. They are unable to work without access to their computing device, so they contact an administrator of the office. The administrator has a USB drive that contains a private key and a reset password associated with the password reset agent that is running on the computing device. The administrator inserts the USB drive into a USB port of the computing device and waits a few moments. During that time, the password reset agent of the computing device polls the USB interface and detects the drive, reads the private key from the drive, and cryptographically verifies the private key using the public key of the agent. Upon verifying the private key, the agent reads the reset password from the USB drive and changes the current password of the computing device to that reset password. The administrator is then able to access the computing device and enable the user of the computing device to reset the password to something they will remember.

In another example, a server device of a company is hacked by a malicious actor and the password is changed. The administrator of the company is alerted to the issue but is unaware of the full extent of the actions taken by the hacker. The administrator wants to perform a forensic analysis of the server device but does not have access due to the changed password. The server device includes a password reset agent that was untouched by the malicious actor due to being run as a root-level process. The administrator connects to the server device and provides a private key and reset password in an appropriate data location such that they are found by the password reset agent of the server device. The server device verifies the private key as described herein and then changes the password of the server device to the reset password, granting the administrator access to the server. The administrator is then able to access the server device and observe the state of the device such that forensic tasks can be performed on the server device.

Exemplary Operating Environment

Figure 5:
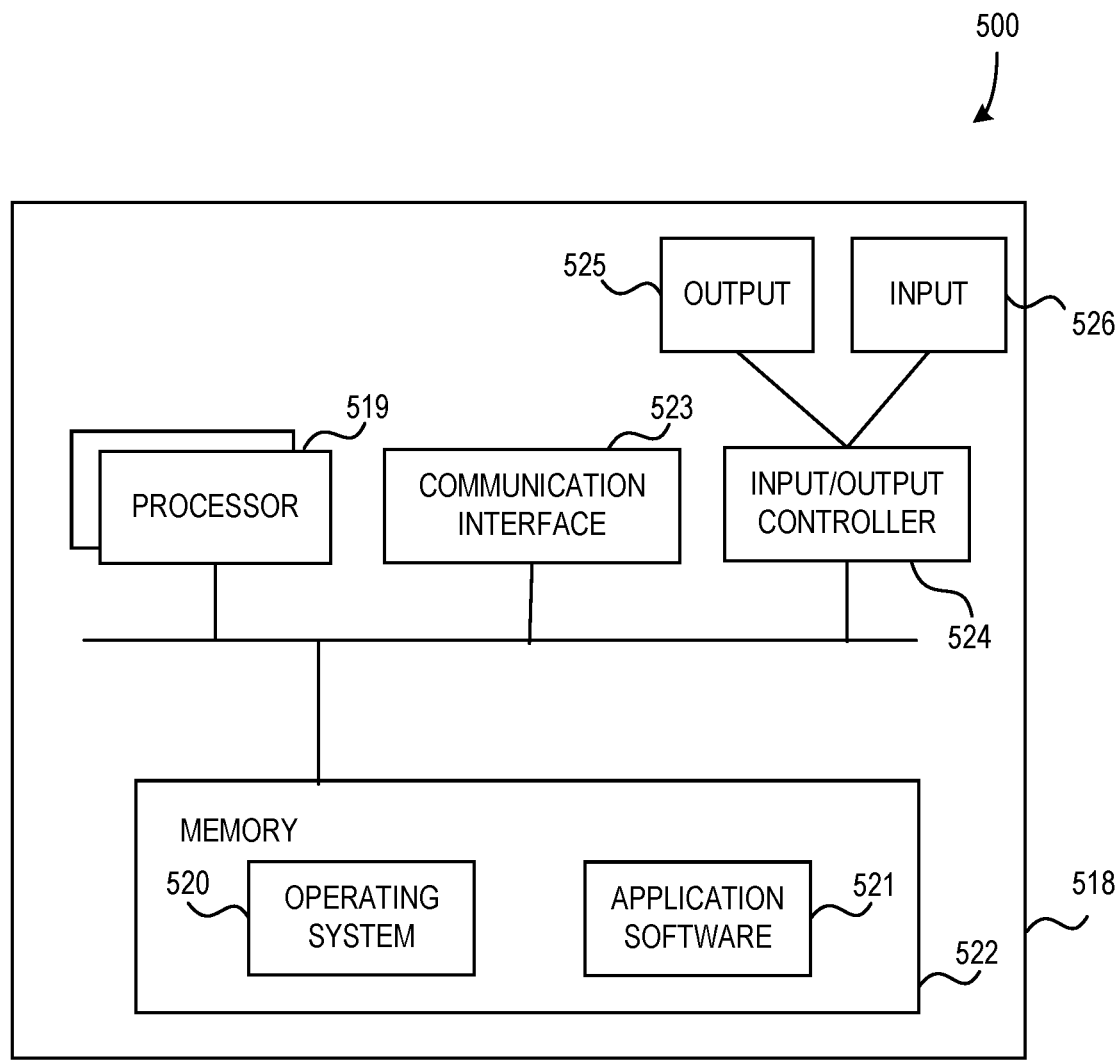
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, executing a password reset agent to automatically change the password of a computing device as described herein is accomplished by software, hardware, and/or firmware.

In some examples, computer executable instructions are provided using any computer-readable media that are accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises at least one processor of a computing device; and at least one memory comprising computer program code, the at least one memory and the computer program code configured to, with the at least one processor, cause the at least one processor to: execute a password reset agent at a root level of the computing device, wherein the password reset agent is associated with a public key; poll, by the password reset agent, a data source for a private key associated with the public key; based on finding the private key on the data source, determine a reset password; and based on determining the reset password, change, by the password reset agent, a current password of the computing device to the determined reset password.

An exemplary computerized method comprises executing, by a processor of a computing device, a password reset agent at a root level of the computing device, wherein the password reset agent is associated with a public key; polling, by the password reset agent, a data source for a private key associated with the public key; based on finding the private key on the data source, determining a reset password; and based on determining the reset password, changing, by the password reset agent, a current password of the computing device to the determined reset password.

One or more computer storage media have computer-executable instructions that, upon execution by a processor, cause the processor to at least: execute a password reset agent at a root level of a computing device, wherein the password reset agent is associated with a public key; poll, by the password reset agent, a data source for a private key associated with the public key; based on finding the private key on the data source, determine a reset password; and based on determining the reset password, change, by the password reset agent, a current password of the computing device to the determined reset password.

Alternatively, or in addition to the other examples described herein, examples include any combination of the following:
  wherein the current password is changed to the determined reset password as a background process without rebooting the computing device and while the computing device is locked.
  wherein polling the data source includes: polling, by the password reset agent, an interface of the computing device for connection to the data source, wherein the data source includes at least one of the following: an external device and a network device; and based on identifying a connected data source via the polling, searching, by the password reset agent, the connected data source for a private key associated with the public key.
  wherein the computing device executes a virtual machine (VM); wherein the password reset agent is executed at a root level of the VM; wherein polling the data source includes polling a VM configuration file of the VM; wherein finding the private key on the data source includes finding the private key in the VM configuration file; and wherein changing the current password of the computing device includes changing a current password of the VM to the determined reset password.
  wherein polling the data source of the computing device is performed periodically.
  wherein finding the private key on the data source includes: identifying a potential private key on the data source; encrypting a test data set using the potential private key as a key; decrypting the encrypted data set using the public key of the password reset agent as a key; and comparing the decrypted data set with the test data set, wherein a match between the decrypted data set and the test data set indicates that the potential private key is the private key.
  wherein determining a reset password includes identifying the reset password stored with the private key on the data source.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for executing, by a processor of a computing device, a password reset agent at a root level of the computing device, wherein the password reset agent is associated with a public key; exemplary means for polling, by the password reset agent, a data source for a private key associated with the public key; based on finding the private key on the data source, exemplary means for determining a reset password; and based on determining the reset password, exemplary means for changing, by the password reset agent, a current password of the computing device to the determined reset password.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    at least one processor of a computing device; and
    at least one memory comprising computer program code, the at least one memory and the computer program code configured to, with the at least one processor, cause the at least one processor to:
        execute a password reset agent at a root level, and not at a user-level, of the computing device running an already booted operating system (OS), causing the reset agent to run continuously as a background process during operation of the computing device, wherein the password reset agent is associated with a public key;
        poll, by the password reset agent, a data source for a private key associated with the public key;
        based on finding the private key on the data source, obtain a reset password from the data source; and
        based on obtaining the reset password, change, by the password reset agent, a current password of the computing device to the obtained reset password.

2. A computerized method comprising:
    executing, by a processor of a computing device, a password reset agent at a root level, and not at a user-level, of the computing device running an already booted operating system (OS), causing the reset agent to run continuously as a background process during operation of the computing device, wherein the password reset agent is associated with a public key;
    polling, by the password reset agent, a data source for a private key associated with the public key;
    based on finding the private key on the data source, obtaining a reset password; and
    based on obtaining the reset password, changing, by the password reset agent, a current password of the computing device to the obtained reset password.

3. The computerized method of claim 2, wherein changing, by the password reset agent, a current password of the computing device includes changing the current password to the obtained reset password upon detecting that the computing device has left a first defined location and entered a second defined location.

4. The computerized method of claim 2, wherein polling the data source includes:
    polling, by the password reset agent, an interface of the computing device for connection to the data source, wherein the data source includes at least one of the following: an external device and a network device; and
    based on identifying a connected data source via the polling, searching, by the password reset agent, the connected data source for a private key associated with the public key.

5. The computerized method of claim 2, wherein the computing device executes a virtual machine (VM);
    wherein the password reset agent is executed at a root level of the VM;
    wherein polling the data source includes polling a VM configuration file of the VM;
    wherein finding the private key on the data source includes finding the private key in the VM configuration file; and
    wherein changing the current password of the computing device includes changing a current password of the VM to the reset password.

6. The computerized method of claim 2, wherein the password reset agent changes the current password when the computing device is inaccessible and displays a lock screen.

7. The computerized method of claim 2, wherein finding the private key on the data source includes:
    identifying a potential private key on the data source;
    encrypting a test data set using the potential private key as a key;
    decrypting the encrypted data set using the public key of the password reset agent as a key; and comparing the decrypted data set with the test data set, wherein a match between the decrypted data set and the test data set indicates that the potential private key is the private key.

8. The system of claim 1, wherein upon the computing device receiving a deactivating signal, the computing device deactivates the password reset agent.

9. The system of claim 1, wherein changing, by the password reset agent, a current password of the computing device includes changing the current password to the obtained reset password upon detecting that the computing device has left a first defined location and entered a second defined location.

10. The system of claim 1, wherein polling the data source includes:
    polling, by the password reset agent, an interface of the computing device for connection to the data source, wherein the data source includes at least one of the following: an external device and a network device; and
    based on identifying a connected data source via the polling, searching, by the password reset agent, the connected data source for a private key associated with the public key.

11. The system of claim 1, wherein the computing device executes a virtual machine (VM);
    wherein the password reset agent is executed at a root level of the VM;
    wherein polling the data source includes polling a VM configuration file of the VM;
    wherein finding the private key on the data source includes finding the private key in the VM configuration file; and
    wherein changing the current password of the computing device includes changing a current password of the VM to the reset password.

12. The system of claim 1, wherein the password reset agent changes the current password when the computing device is inaccessible and displays a lock screen.

13. The system of claim 1, wherein finding the private key on the data source includes:
    identifying a potential private key on the data source;
    encrypting a test data set using the potential private key as a key;
    decrypting the encrypted data set using the public key of the password reset agent as a key; and
    comparing the decrypted data set with the test data set, wherein a match between the decrypted data set and the test data set indicates that the potential private key is the private key.

14. The computerized method of claim 2, wherein upon the computing device receiving a deactivating signal, the computing device deactivates the password reset agent.

15. One or more computer storage media having computer-executable instructions that, upon execution by a processor, cause the processor to at least:
    execute a password reset agent at a root level, and not at a user-level, of a computing device running an already booted operating system (OS), causing the reset agent to run continuously as a background process during operation of the computing device, wherein the password reset agent is associated with a public key;
    poll, by the password reset agent, a data source for a private key associated with the public key;
    based on finding the private key on the data source, obtain a reset password; and
    based on obtaining the reset password, change, by the password reset agent, a current password of the computing device to the obtained reset password.

16. The one or more computer storage media of claim 15, wherein changing, by the password reset agent, a current password of the computing device includes changing the current password to the obtained reset password upon detecting that the computing device has left a first defined location and entered a second defined location.

17. The one or more computer storage media of claim 15, wherein polling the data source includes:
    polling, by the password reset agent, an interface of the computing device for connection to the data source, wherein the data source includes at least one of the following: an external device and a network device; and
    based on identifying a connected data source via the polling, searching, by the password reset agent, the connected data source for a private key associated with the public key.

18. The one or more computer storage media of claim 15, wherein the computing device executes a virtual machine (VM);
    wherein the password reset agent is executed at a root level of the VM;
    wherein polling the data source includes polling a VM configuration file of the VM;
    wherein finding the private key on the data source includes finding the private key in the VM configuration file; and
    wherein changing the current password of the computing device includes changing a current password of the VM to the reset password.

19. The one or more computer storage media of claim 15, wherein upon the computing device receiving a deactivating signal, the computing device deactivates the password reset agent.

20. The one or more computer storage media of claim 15, wherein finding the private key on the data source includes:
    identifying a potential private key on the data source;
    encrypting a test data set using the potential private key as a key;
    decrypting the encrypted data set using the public key of the password reset agent as a key; and
    comparing the decrypted data set with the test data set, wherein a match between the decrypted data set and the test data set indicates that the potential private key is the private key.

* * * * *